United States Patent
Lee et al.

(10) Patent No.: US 10,185,287 B2
(45) Date of Patent: Jan. 22, 2019

(54) ILLUMINATION APPARATUS AND HOLOGRAPHIC DISPLAY APPARATUS INCLUDING THE SAME

(71) Applicant: SAMSUNG DISPLAY CO., LTD., Yongin-si, Gyeonggi-do (KR)

(72) Inventors: Hye Sog Lee, Osan-si (KR); Jae Joong Kwon, Suwon-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 134 days.

(21) Appl. No.: 15/451,864

(22) Filed: Mar. 7, 2017

(65) Prior Publication Data

US 2017/0261931 A1 Sep. 14, 2017

(30) Foreign Application Priority Data

Mar. 8, 2016 (KR) .................. 10-2016-0027780

(51) Int. Cl.
*G03H 1/22* (2006.01)
*F21V 8/00* (2006.01)
*G02B 27/14* (2006.01)

(52) U.S. Cl.
CPC ......... *G03H 1/2286* (2013.01); *G02B 6/0001* (2013.01); *G02B 27/14* (2013.01);
(Continued)

(58) Field of Classification Search
CPC ...... H04N 13/00; G11C 13/04; G11B 7/0065; G06K 19/16; G06E 3/00; G02B 27/22;
(Continued)

(56) References Cited

U.S. PATENT DOCUMENTS

| 4,498,729 A | * | 2/1985 | Benton | .................. G03H 1/24 359/10 |
| 7,581,863 B2 | | 9/2009 | Lester | |

(Continued)

FOREIGN PATENT DOCUMENTS

| KR | 10-2009-0124751 | 12/2009 |
| KR | 10-2011-0123829 | 11/2011 |

(Continued)

OTHER PUBLICATIONS

Hu et al., "Flat-Panel Coherent Backlight for Holographic Displays With Improved Diffraction Efficiency", SID 2015 Digest, p. 530-533.

*Primary Examiner* — Jennifer D. Carruth
(74) *Attorney, Agent, or Firm* — F. Chau & Associates, LLC (57) ABSTRACT

An illumination apparatus includes a light source unit emitting coherent light in a first direction, a first light division unit, including a plurality of first slots, receiving the coherent light, each slot of the plurality of first slots reflecting a part of the coherent light in a second direction crossing the first direction, and a surface lighting plate including a plurality of second light division units, each light division unit of the plurality of second light division units includes a light guide through which light progresses, and each light division unit of the plurality of second light division units includes a plurality of second slots. Each slot of the plurality of second slots of each second light division unit reflects a part of the coherent light received from a corresponding slot of the plurality of first slots in a third direction which crosses the first and second directions.

19 Claims, 5 Drawing Sheets

(52) U.S. Cl.
CPC ....... *G03H 1/2294* (2013.01); *G03H 2222/53* (2013.01); *G03H 2223/16* (2013.01); *G03H 2223/18* (2013.01)

(58) Field of Classification Search
CPC ........ G02B 6/02; G02B 26/106; G02B 5/203; G02B 5/32; G02B 5/18; G03B 35/00; G03H 1/10; G03H 1/12; G03H 1/14; G03H 1/2645; G03H 1/265; G03H 2001/2655; G03H 2001/266; G03H 2001/2665; G03H 2001/26; G03H 2001/0489; G03H 2210/10; G03H 2210/20; G03H 2210/30; G03H 2225/33; G03H 2225/34; G03H 1/268; G03H 2001/0421; G03H 2001/0423; G03H 2001/0426; G03H 1/00; G03H 2001/0016; G03H 2001/0212; G03H 2222/14; G03H 2222/16; G03H 2222/17; G03H 2222/18; G03H 2222/20; G03H 2222/23; G03H 2222/24; G03H 2222/31; G03H 2222/32; G03H 2222/33; G03H 2222/34; G03H 2222/35; G03H 2222/36; G03H 2222/40; G03H 2001/2226; G03H 1/0276; G03H 1/028; G03H 1/0402; G03H 1/0404; G03H 2001/0216; G03H 2001/022; G03H 2001/0284; G03H 2001/0288; G03H 2001/0292; G03H 2001/0296; G03H 2001/0413; G03H 2001/0415; G03H 2001/0419; G03H 2001/0445; G03H 2001/0447; G03H 2001/0469; G03H 2001/0471; G03H 2001/0473; G03H 1/0005; G03H 2001/2292; G03H 1/2249; G03H 2001/2213; G03H 2001/02; G03H 2001/2265

See application file for complete search history.

(56) References Cited

U.S. PATENT DOCUMENTS

| | | | |
|---|---|---|---|
| 8,605,233 | B2 | 12/2013 | Lee et al. |
| 8,823,632 | B2 | 9/2014 | Chi et al. |
| 9,190,019 | B2 * | 11/2015 | Tanaka ................... G09G 5/10 |
| 2013/0321345 | A1 | 12/2013 | Burns |
| 2015/0268399 | A1 * | 9/2015 | Futterer ................. G02B 6/005 |
| | | | 315/151 |
| 2016/0003997 | A1 | 1/2016 | Ouderkirk |

FOREIGN PATENT DOCUMENTS

| | | |
|---|---|---|
| KR | 10-2015-0018850 | 2/2015 |
| KR | 10-2015-0117661 | 10/2015 |
| WO | 2014126740 | 8/2014 |

* cited by examiner

ILLUMINATION APPARATUS AND HOLOGRAPHIC DISPLAY APPARATUS INCLUDING THE SAME

CROSS-REFERENCE TO RELATED APPLICATION

This application claims priority under 35 U.S.C. § 119 to Korean Patent Application No. 10-2016-0027780, filed in the Korean Intellectual Property Office on Mar. 8, 2016, the disclosure of which is incorporated by reference herein in its entirety.

TECHNICAL FIELD

The present invention relates to a holographic display apparatus, and more particularly, to a holographic display apparatus including an illumination apparatus.

DISCUSSION OF THE RELATED ART

A hologram is a recording of an interference pattern formed by an interference of light (e.g., an object wave) that is reflected or diffracted by an object with other coherent light (e.g., a reference wave) on a film. An amplitude and phase information of the object may be recorded together in the interference pattern.

A holography method may include directing the reference wave to the interference pattern recorded in the hologram to display a three-dimensional (3D) image of the object.

The holography method may include using a spatial light modulator and an illumination apparatus.

For example, a computer generated hologram, generated by using a computer, may be input to the spatial light modulator as an electrical signal. The spatial light modulator may form the interference pattern based on the input signal.

The illumination apparatus provides light to the spatial light modulator. The illumination apparatus may convert the light of a coherent light source such as a laser into plane surface light which may then be provided to the spatial light modulator. The light provided from the illumination apparatus is diffracted by the spatial light modulator, and the diffracted light forms a stereoscopic image at a predetermined position in space.

SUMMARY

According to an exemplary embodiment of the present invention, an illumination apparatus provides planar light that is coherent and collimated, and a holographic display apparatus includes the illumination apparatus.

According to an exemplary embodiment of the present invention, an illumination apparatus provides planar light having a uniform intensity, and a holographic display apparatus includes the illumination apparatus.

According to an exemplary embodiment of the present invention, an illumination apparatus includes a light source unit emitting coherent light in a first direction, a first light division unit, including a plurality of first slots, receiving the coherent light, wherein each slot of the plurality of first slots reflects a part of the coherent light in a second direction crossing the first direction, and a surface lighting plate including a plurality of second light division units, wherein each light division unit of the plurality of second light division units includes a light guide through which light progresses, and wherein each light division unit of the plurality of second light division units includes a plurality of second slots. Each slot of the plurality of second slots of each light division unit of the plurality of second light division units reflects a part of the coherent light received from a corresponding slot of the plurality of first slots in a third direction, wherein the third direction crosses the first and second directions.

According to an exemplary embodiment of the present invention, an illumination apparatus includes a light source unit emitting coherent light in a first direction, a first light division unit including a plurality of first slots receiving the coherent light, wherein each slot of the plurality of first slots reflects a part of the coherent light in a second direction crossing the first direction, and a surface lighting plate including a light guide and a plurality of second light division units reflecting a part of the coherent light received from a corresponding slot of the plurality of first slots in a third direction, wherein the third direction crosses. A plurality of first prisms is disposed at a first surface of the light guide, each prism of the plurality of first prisms having a first diagonal surface. A plurality of second prisms is disposed at a second surface of the light guide, the first and second surfaces of the light guide being opposite to each other, and each prism of the plurality of second prisms has a second diagonal surface.

According to an exemplary embodiment of the present invention, a holographic display apparatus includes a lighting unit emitting planar light and a spatial light modulation unit modulating at least one of an amplitude or a phase of the planar light. The lighting unit includes a light source unit emitting coherent light in a first direction, a first light division unit including a plurality of first slots and receiving the coherent light, wherein each slot of the plurality of first slots reflects a part of the coherent light in a second direction crossing the first direction, and a surface lighting plate including a plurality of second light division units, wherein each light division unit of the plurality of second light division units includes a light guide through which light progresses, and wherein each light division unit of the plurality of second light division units includes a plurality of second slots. Each slot of the plurality of second slots of each light division unit of the plurality of second light division units reflects a part of the coherent light received from a corresponding slot of the plurality of first slots in a third direction, wherein the third direction crosses the first and second directions. The planar light emitted from the lighting unit is the light reflected in the third direction from the plurality of second light division units.

According to an exemplary embodiment of the present invention, an illumination apparatus includes a light source unit emitting coherent light in a first direction, a first light division unit including a plurality of first slots receiving the coherent light, wherein each slot of the plurality of first slots reflects a part of the coherent light in a second direction crossing the first direction, wherein each slot of the plurality of first slots extends along a direction that forms an acute angle with respect to the first and second directions, and a surface lighting plate including a plurality of second light division units, wherein each light division unit of the plurality of second light division units extends in a plane formed by the first and second directions and includes a light guide through which light progresses, wherein each light division unit of the plurality of second light division units includes a plurality of second slots. Each slot of the plurality of second slots of each light division unit of the plurality of second light division units reflects a part of the coherent light received from a corresponding slot of the plurality of first slots in a third direction, wherein the third direction crosses the first and second directions. Each slot of the plurality of second slots extends along a direction that forms an acute angle with respect to the second and third directions.

BRIEF DESCRIPTION OF THE DRAWINGS

The above and other features of the present invention will become more apparent by describing in detail exemplary embodiments thereof in conjunction with the accompanying drawings, in which.

DETAILED DESCRIPTION OF THE EMBODIMENTS

Exemplary embodiments of the present invention will be described more fully hereinafter with reference to the accompanying drawings. The present invention may, however, be embodied in different forms and should not be construed as limited to the embodiments set forth herein. Like reference numerals may refer to like elements throughout the specification.

The sizes and/or proportions of the elements shown in the drawings may be exaggerated for clarity. In addition, when an element is referred to as being "on" another element, it can be directly on the other element or intervening elements may also be present therebetween.

A holographic display apparatus according an exemplary embodiment will be described with reference to FIG. 1.

Figure 1:
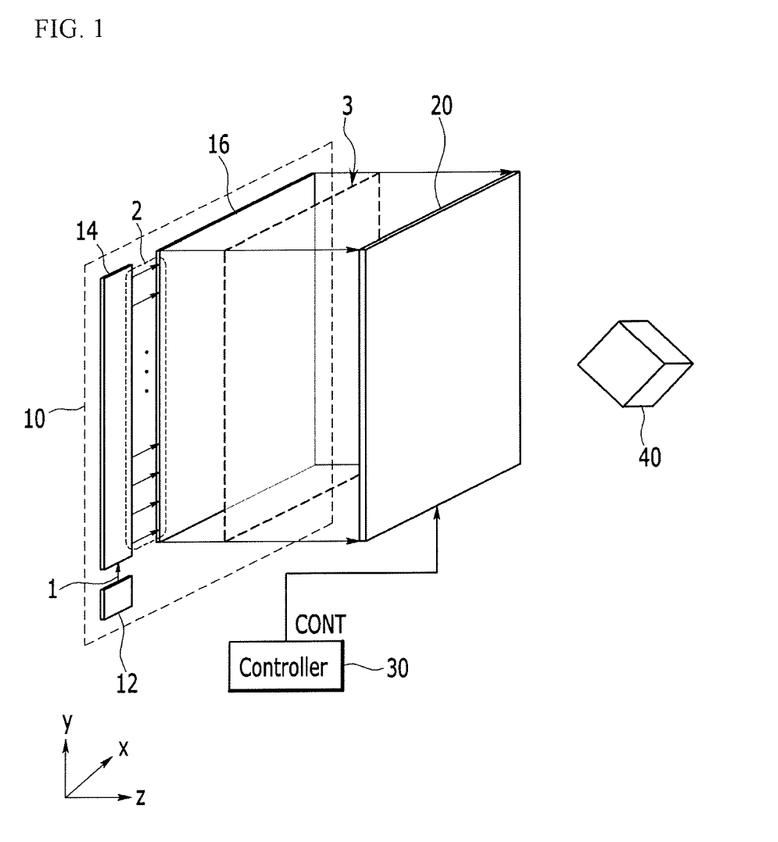
FIG. 1 is a perspective view illustrating a holographic display apparatus according to an exemplary embodiment of the present invention.

FIG. 1 is a perspective view illustrating a holographic display apparatus according to an exemplary embodiment of the present invention. The holographic display apparatus may include a lighting unit 10 and a spatial light modulation unit 20. When planar light 3, generated from the lighting unit 10, is directed toward the spatial light modulation unit 20, a holographic image 40 is displayed at a certain position in space.

The lighting unit 10 may include a light source unit 12, a first light division unit 14 and a surface lighting plate 16.

The light source unit 12 may emit collimated light 1. The light 1 emitted from the light source unit 12 may be coherent. For example, the light source unit 12 may include a laser light source outputting coherent light. The laser light source may emit a continuous wave (CW) laser beam or a quasi-CW laser beam. The laser light source may be included in the light source unit 12. In addition, the light source unit 12 may include a light emitting diode (LED) light source. Hereinafter, it is assumed that the light source unit 12 includes an LED light source.

Light 1, emitted from the light source unit 12, may be incident on the first light division unit 14. For example, the light source unit 12 emits the light 1 in a y-axis direction.

The first light division unit 14 reflects the light 1 in an x-axis direction that crosses the y-axis direction. For example, while the light 1 progresses in the y-axis direction through the first light division unit 14, predetermined portions of the light 1 are reflected in the x-axis direction by a plurality of slots BS1-BSn (referring to FIG. 2) of the first light division unit 14. Thus, the first light division unit 14 may emit light 2 in a direction parallel to the x-axis direction at different locations along the y-axis. The light 2 may be incident on the surface lighting plate 16.

The surface lighting plate 16 converts the light 2 into planar light 3. The planar light 3 may be reflected in a z-axis direction. The z-axis direction crosses the x and y-axis directions. While the light 2 progresses through the surface lighting plate 16 in the x-axis direction, predefined portions of the light 2 are reflected in the z-axis direction by a plurality of light division units B1-Bn (referring to FIG. 2). The light division units B1-Bn may be formed in the surface lighting plate 16. Thus, the surface lighting plate 16 may emit the planar light 3 along the z-axis direction toward the spatial light modulation unit 20. The planar light 3 may be coherent.

The spatial light modulation unit 20 may modulate the amplitude and/or the phase of the light 3 by using a signal CONT. The signal cont may be input from a controller 30. The spatial light modulation unit 20 may realize a hologram pattern by using the signal CONT.

For example, the spatial light modulation unit 20 may include a liquid crystal layer, the arrangement of the liquid crystal molecules of which may be changed depending on the signal CONT. The amplitude and/or the phase of the light 3, passing through the liquid crystal layer, may be modulated according to the arrangement of the liquid crystal molecules.

A holographic display apparatus, according to an exemplary embodiment of the present invention, may display a holographic image 40 at a viewing position while the coherent planar light 3 is diffracted from the spatial light modulation unit 20.

Figure 2:
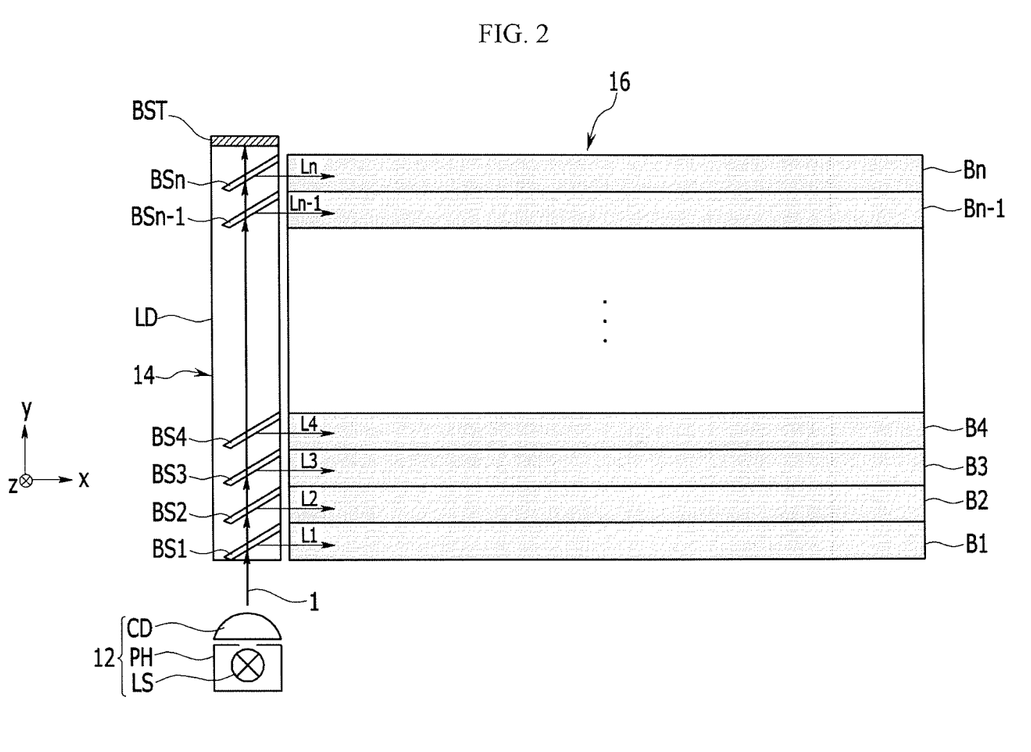
FIG. 2 is a side view illustrating a lighting unit of an illumination apparatus according to an exemplary embodiment of the present invention.

FIG. 2 is a side view illustrating a lighting unit of an illumination apparatus according to an exemplary embodiment of the present invention. As shown in FIG. 2, the lighting unit 10 may include a light source unit 12, a first light division unit 14 and a surface lighting plate 16. The surface lighting plate 16 includes a plurality of second light division units B1-Bn.

The light source unit 12 may include an LED light source LS, a pinhole PH, and a collimator CD. The LED light source LS may include a red light source R, a green light source G and a blue light source B.

The pinhole PH is positioned in a direction in which the light emitted from the LED light source LS progresses. When the light 1 emitted from the LED light source LS passes through the pinhole PH, the spatial coherence of the light may be increased. The light 1 may pass through the collimator CD after passing through the pinhole PH.

The collimator CD may collimate the light 1 emitted from the LED light source LS. The collimator CD may include at least one lens for collimation of the light 1. The collimated light 1 progresses to the first light division unit 14.

The first light division unit 14 includes a plurality of slots BS1-BSn and a light guide LD. The light guide LD may include a light stopper BST. The first light division unit 14 may have a shape that extends primarily along a direction (e.g., the y-axis direction) in which the light 1 travels.

The light 1 is incident on an end of the first light division unit 14 and then progresses through the light guide LD. When the light 1 passes through a plurality of slots BS1-BSn within the light guide LD, while progressing through the light guide LD, a portion of the light 1 may be reflected by each slot of the plurality of slots BS1-BSn depending on a reflection ratio of each slot of the plurality of slots BS1-BSn.

The plurality of slots BS1-BSn may be positioned at a side of the light guide LD and may be inclined with respect to the y-axis direction by a predetermined angle. Also, the plurality of slots BS1-BSn may be separated from each other.

The plurality of slots BS1-BSn reflect the incident light 1 in a direction parallel to the x-axis direction depending on their individual reflection ratios. A portion of the light 1, having passed through one or more of the slots BS1-BSn, may continue traveling in the y-axis direction and may be at least partially reflected in the x-axis direction by the following slots of the plurality of slots BS1-BSn which are on its travel path. Further, each reflection ratio of the plurality of slots BS1-BSn of the first light division unit 14 may be set so that a plurality of reflection lights L1-Ln have approximately the same intensity. The lights L1-Ln may be respectively incident on the plurality of second light division units B1-Bn. The second light division units B1-Bn may be formed in the surface lighting plate 16.

For example, the slots BS1-BSn may correspond to the second light division units B1-Bn. The light 1 is reflected or transmitted by the slots BS1-BSn of the first light division unit 14, and the plurality of reflection lights L1-Ln, having approximately or substantially the same intensity, are incident on the second light division units B1-Bn. For example, the first light division unit 14 reflects the reflection lights L1-Ln in the direction parallel to the x-axis direction, the reflection lights L1-Ln having a substantially uniform intensity. The reflection lights L1-Ln travel in the direction substantially parallel to the x-axis direction from different points along the y-axis direction.

The plurality of slots BS1-BSn may include a transmissive material having a different refractive index from the refractive index of the material included in the light guide LD. The plurality of slots BS1-BSn may include a glass such as SiO2, Al2O3, SiN2, and the like, or a polymer such as polyimide (PI), polyethylene terephthalate (PET), and the like.

For example, the light guide LD may include a transmissive material having a low refractive index. The plurality of slots BS1-BSn may include a transmissive material having a larger refractive index than the refractive index of the material included in the light guide LD. By the difference between the refractive indexes of the materials included in the slots BS1-BSn and the light guide LD, a ratio of transmittance of the light 1 and reflectance of the light 1 of the plurality of slots BS1-BSn may be set.

The ratio of transmittance of the light 1 and reflectance of the light 1, a magnitude, a shape, a position, and a material included in the plurality of slots BS1-BSn may be changed. For example, the plurality of slots BS1-BSn may be positioned with various arrangements at the light guide LD to make the plurality of reflection lights L1-Ln to have a substantially uniform intensity onto each of the second light division units B1-Bn. Also, the plurality of slots BS1-BSn may be formed to have different transmittance from each other to make the plurality of reflection lights L1-Ln of the substantially uniform intensity incident on each of the second light division units B1-Bn.

The light stopper BST may be positioned at an end of the first light division unit 14 opposite to the end of the first light division unit 14 on which the light 1 is incident. The light stopper BST may suppress the reflection of the incident light. For example, the light stopper BST absorbs the light passing through the slot BSn and the light that is reflected or diffracted from the slots BS1-BSn. Accordingly, the light stopper BST may suppress light reflection.

The slight stopper BST may include a light absorption material or a light absorption member. The end of the first light division unit 14 on which the light stopper BST is disposed may face the end on which the light 1 is incident in the y-axis direction. The surface lighting plate 16 includes the plurality of second light division units B1-Bn, and the plurality of second light division units B1-Bn may extend in the x-axis direction and may be arranged in the y-axis direction. The substantially uniform lights L1-Ln reflected from the first light division unit 14 may be respectively incident on the plurality of second light division units B1-Bn.

The plurality of second light division units B1-Bn reflects the lights incident from the first light division unit 14 in the z-axis direction. For example, a second light division unit, from among the second light division units B1-Bn, reflects a correspond light, from among the lights L1-Ln, in a direction parallel to the z-axis direction at location along the x-axis direction. Accordingly, the plurality of second light division units B1-Bn may direct a uniform planar light in a direction parallel to the z-axis direction.

Hereinafter, the second light division units B1-Bn will be described in detail with reference to FIG. 3 to FIG. 5. Various exemplary embodiments of a second light division unit B1, among the plurality of second light division units B1-Bn included in the surface lighting plate 16, will be described. The rest of the second light division units B2-Bn among the plurality of second light division units B1-Bn may have the same configuration and structure as the second light division unit B1. Thus, a description of the second light division units B2-Bn may be omitted for brevity.

Figure 3:
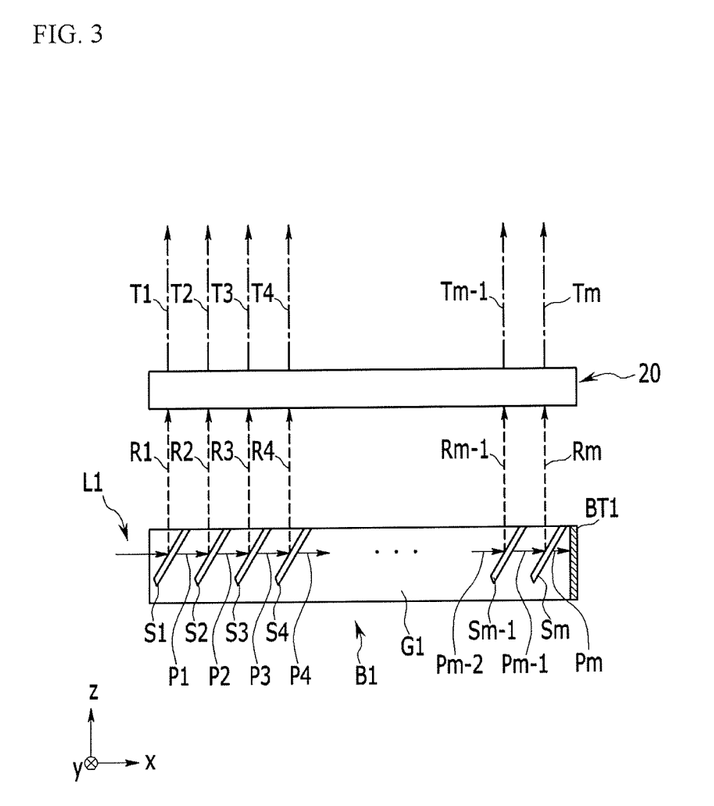
FIG. 3 to FIG. 5 are side views illustrating second light division units of an illumination apparatus according exemplary embodiments of the present invention.

FIG. 3 is a side view illustrating a second light division unit of an illumination apparatus according exemplary embodiments of the present invention.

As shown in FIG. 3, the second light division unit B1 includes a light guide G1 in which a plurality of slots S1-Sm and a light stopper BT1 are disposed. The second light division unit B1 may have a shape that is elongated along the direction in which the light is incident, for example, in the direction in which the light travels. The light stopper BT1 may have the same configuration as or a similar configuration to the light stopper BST described in FIG. 2.

The plurality of slots S1-Sm may be positioned at a side of the light guide G1 to be inclined with respect to the z-axis direction by a predetermined angle. Also, the plurality of slots S1-Sm may be aligned to be separated from each other by a predetermined distance. The plurality of slots S1-Sm may reflect the parts R1-Rm of the incident lights L1 and P1-Pm−1 in the direction parallel to the z-axis direction.

For example, the light L1 reflected from the slot BS1 of the first light division unit 14 is incident on the second light division unit B1. The part R1 of the light L1 is reflected from the slot S1 of the second light division unit B1 in the z-axis direction. The part of the light L1 that is not reflected from the slot S1 and progresses past the slot S1 toward the slot S2. Although not shown, the part of the light L1 that is not reflected from the slot S1 may be refracted inside the light guide G1.

In this case, a ratio of the part R1 and the part of the light L1 that is not reflected from the slot S1 may be determined by the reflectance of the slot S1. The slots S1-Sm may have the same reflectance. As the light progresses inside the light guide G1, the intensity of the lights R1-Rm reflected from each of the slots S1-Sm may decrease. This is because the part P1-Pm−1 of the light is transmitted in each of the slots S1-Sm−1.

The lights R1-Rm, having a deviation in the second light division unit B1, may be incident on the spatial light modulation unit 20. Also, since the second light division unit B1 is disposed on the surface lighting plate 16 to have a width in the y-axis direction and a length in the x-axis direction, the surface lighting plate 16 may reflect (e.g., direct) planar light to the spatial light modulation unit 20.

To decrease the deviation of the lights R1-Rm of the spatial light modulation unit 20, the intensity of the light passing through the spatial light modulation unit 20 may be modulated by changing the liquid crystal arrangement of the liquid crystal layer. In this case, the spatial light modulation unit 20 decreases the intensity of the lights R1-Rm based on the reflection position of the lights R1-Rm so that the lights T1-Tm passing through the spatial light modulation unit 20 have the uniform intensity. For example, as the reflection position of the lights R1-Rm is closer to the light incident side of the second light division unit B1 (e.g., the side where the light L1 enters), the spatial light modulation unit 20 further decreases the intensity of the lights R1-Rm.

For example, if it is assumed that the intensity of the incident light L1 is 100, the reflectance of the slots S1-Sm is 4%, and m=11, the intensity of each of the lights R1-Rm reflected from each of the slots S1-Sm of the second light division unit B1 and the intensity of each light of the lights T1-Tm passing through the spatial light modulation unit 20 may be represented in Table 1 as follows.

TABLE 1

| | Slot | | | | | | | | | | |
|---|---|---|---|---|---|---|---|---|---|---|---|
| | S1 | S2 | S3 | S4 | S5 | S6 | S7 | S8 | S9 | S10 | S11 |
| R1-Rm (intensity) | 4.00 | 3.84 | 3.69 | 3.54 | 3.40 | 3.26 | 3.13 | 3.00 | 2.89 | 2.77 | 2.66 |
| T1-Tm (intensity) | 2.52 | 2.52 | 2.52 | 2.51 | 2.51 | 2.50 | 2.50 | 2.50 | 2.50 | 2.50 | 2.50 |

As shown in Table 1, the intensity of the lights R1-Rm reflected from the slots S1-Sm may have the deviation. Depending on the distance from the side on which the light L1 is incident on the second light division unit B1 to a particular slot from the slots S1-Sm, the intensity of the lights R1-Rm reflected from the slots S1-Sm is different.

For example, the intensity of the light R1, reflected from the slot S1 from which the incident light L1 is reflected first, is the highest, and the intensity of the light Rm, reflected from the finally positioned slot Sm, is the lowest.

Also, the spatial light modulation unit 20 may decrease the intensity of the transmitted light to be differentiated depending on the distance from the side from which the light is incident on the second light division unit B1 to a particular slot from among the slots S1-Sm.

For example, the spatial light modulation unit 20 may decrease the intensity of the light R1 reflected from the slot S1 by 1.48, and the intensity of the light R2 reflected from the slot S2 by 1.32. Accordingly, when the light R1 reflected from the slot S1 and the light R2 reflected from the slot S2 passes through the spatial light modulation unit 20, each intensity is decreased to 2.52, and the lights T1 and T2 may have the same intensity.

For example, when the lights reflected from the slots S1-Sm pass through the spatial light modulation unit 20, the intensity of the lights T1-Tm may be uniform.

According to an exemplary embodiment of the present invention, to provide a planar light by reflecting the plurality of reflection lights L1-Ln in the z-axis direction, a prism may be used in the second light division unit B1 instead of the slots S1-Sm.

Hereinafter, another exemplary embodiment will be described with reference to FIG. 4. The description of the same contents as in the previous exemplary embodiment is omitted.

Figure 4:
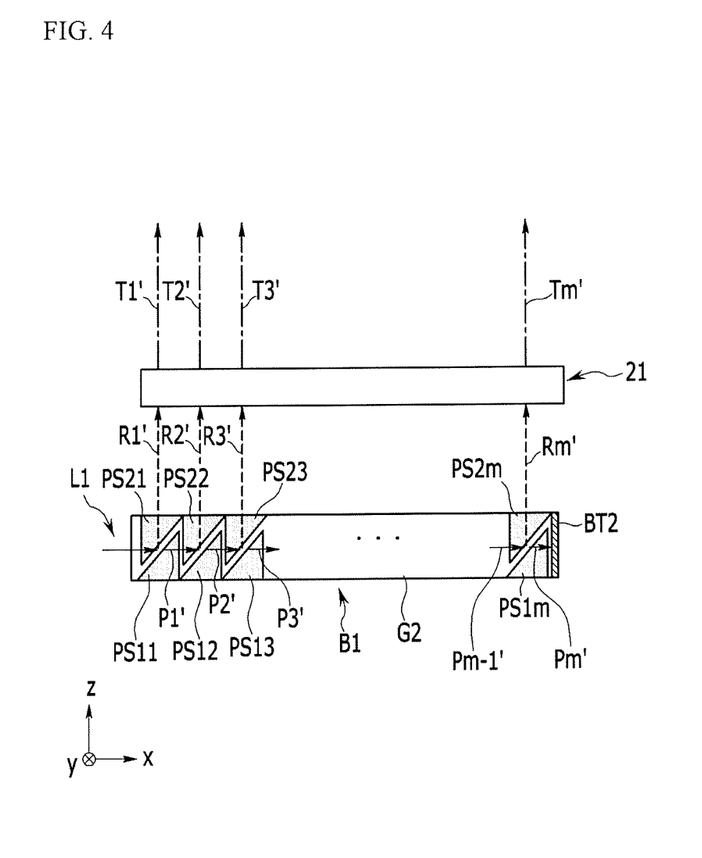

FIG. 4 is a side view illustrating a second light division unit of an illumination apparatus according to exemplary embodiments of the present invention.

As shown in FIG. 4, the second light division unit B1 includes a plurality of first prisms PS11-PS1m, a plurality of second prisms PS21-PS2m, and a light guide G2 in which a light stopper BT2 is disposed. The light stopper BT2 may have the same or similar configuration to that of the light stopper BST described in FIG. 2. Thus, a duplicate description thereof may be omitted for brevity.

The plurality of first prisms PS11-PS1m and the plurality of second prisms PS21-PS2m have a sawtooth-type pattern (or triangular pattern) and may be disposed to face each other.

The first prisms PS11-PS1m may have a first diagonal surface inclined by a first angle with respect to the z-axis, a side surface parallel to the x-axis, and an output surface parallel to the z-axis. The plurality of first prisms PS11-PS1m may be disposed on a first surface of the light guide G2.

The second prisms PS21-PS2m may have an incident surface parallel to the z-axis, a second diagonal surface inclined with respect to the z-axis by a second angle, and the output surface parallel to the x-axis. The plurality of second prisms PS21-PS2m may be disposed on a second surface of the light guide G2 facing the first surface of the light guide G2. In this case, the first prisms PS11-PS1m and the second prisms PS21-PS2m may be aligned to match with each other, and the first angle and the second angle may be the same.

The plurality of first prisms PS11-PS1m may respectively reflect the incident lights L1 and P1'-Pm−1' in a direction parallel to the z-axis direction. For example, the light L1 reflected from the slot BS1 of the first light division unit 14 is incident on the light incident surface of the second prism PS21. A part R1' of the incident light L1 is reflected from the diagonal surface of the second prism PS21 in the z-axis direction. The reflected light R1' progresses to a spatial light modulation unit 21 through the output surface of the second prism PS21. Also, the part P1' of the incident light L1 (e.g., the portion of the light L1 remaining after the portion R1' is reflected) progresses from the diagonal surface to the diagonal surface of the first prism PS11. The light P1' is incident on the incident surface of the first prism PS11 and progresses to the second prism PS22 through the output surface of the first prism PS11. Although not shown, a part of the lights L1 and P1'-Pm' may be refracted or reflected inside the light guide G2, and on the diagonal surface of the first prisms PS11-PS1m and the second prisms PS21-PS2m.

Since the parts P1'-Pm−1' of the light are transmitted on each of the prisms PS11-PS1m and PS21-PS2m, as the light progresses inside the light guide G2, the intensity of the lights P1'-Pm' progressing inside the light guide G2 is gradually decreased. As the light progresses inside the light guide G2, the intensity of the lights R1'-Rm' reflected to the spatial light modulation unit 21 is gradually decreased.

The lights R1'-Rm', having a deviation in the second light division unit B1, may be incident on the spatial light modulation unit 21. Also, since the second light division unit B1 is disposed on the surface lighting plate 16 to have a width in the y-axis direction and a length in the x-axis direction, the surface lighting plate 16 may reflect (e.g., direct) planar light to the spatial light modulation unit 21.

To reduce the deviation of the lights R1'-Rm', the spatial light modulation unit 21 changes the liquid crystal arrangement of the liquid crystal layer to modulate the intensity of the light passing through the spatial light modulation unit 20. In this case, the spatial light modulation unit 21 reduces the intensity of the lights R1'-Rm' based on the reflection position of the lights R1'-Rm' such that the lights T1'-Tm' passing through the spatial light modulation unit 21 may be modulated to have the uniform intensity. For example, the closer the reflection position of the lights R1'-Rm' to the light incident side of the second light division unit B1, the more the spatial light modulation unit 21 reduces the intensity of the lights R1'-Rm'.

According to an exemplary embodiment of the present invention, the interval between two adjacent slots among a plurality of slots may be set to be differentiated depending on the intensity of the light reflected by the plurality of slots. For example, the interval between two slots may be narrower farther away from the side where the light L1 is incident.

Hereinafter, an exemplary embodiment of the present invention will be described with reference to FIG. 5.

Figure 5:
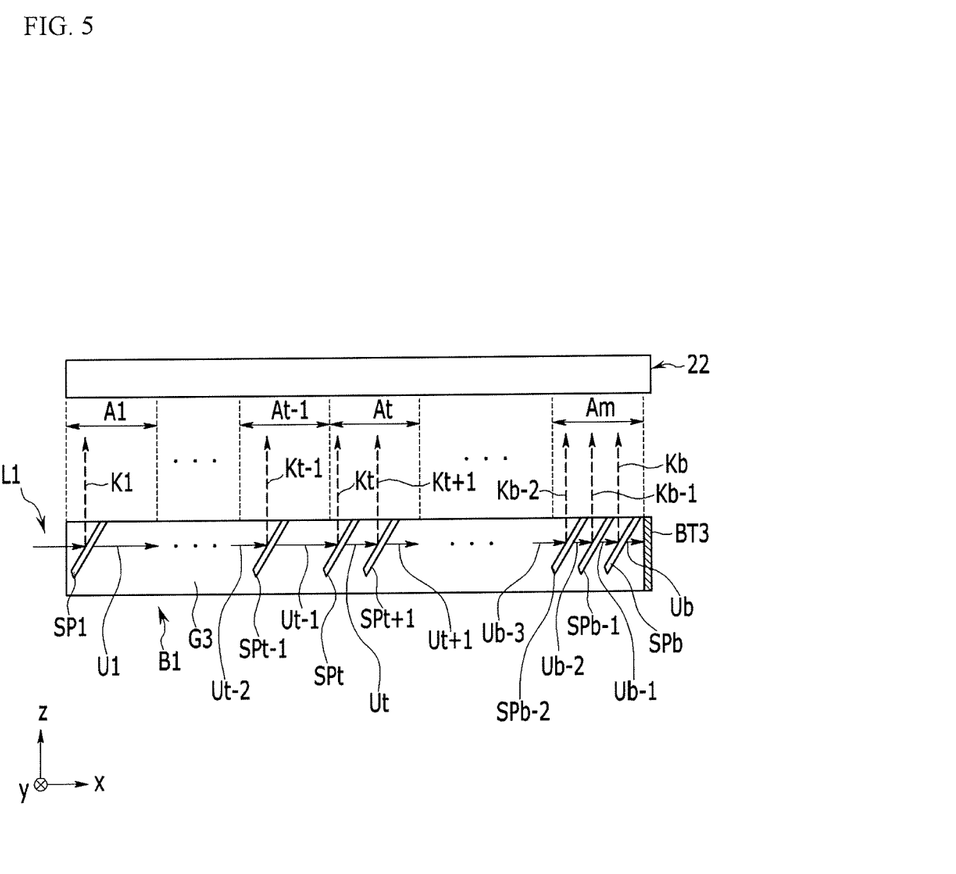

FIG. 5 is a side view illustrating a second light division unit of an illumination apparatus according exemplary embodiments of the present invention.

As shown in FIG. 5, the second light division unit B1 includes a plurality of slots SP1-SPb and a light guide G3 in which a light stopper BT3 is disposed. The light stopper BT3 may have the same or similar configuration to that of the light stopper BST described in FIG. 2. Thus, a duplicate description thereof may be omitted for brevity.

The plurality of slots SP1-SPb may be positioned at a first side of the light guide G3 to be inclined with respect to the z-axis by the predetermined angle. The plurality of slots SP1-SPb may reflect the parts K1-Kb of the incident light L1 in a direction parallel to the z-axis direction and the parts U1-Ub−1 in a direction parallel to the x-axis direction.

For example, the light L1, reflected from the slot BS1 of the first light division unit 14, is incident on the second light division unit B1. The part K1 of the light L1 is reflected from the slot SP1 of the second light division unit B1 in the z-axis direction. The other part U1 of the light L1 may progress through the slot SP1. Although not shown, the other part of the light L1 may be refracted inside the light guide G3.

In this case, the ratio of the part K1 and the other part U1 may be determined by the reflectance of the slot SP1. The slots SP1-SPb may have the same reflectance. Accordingly, in each of a plurality of divided regions A1-Am of the light guide G3, a plurality of slots SP1-SPb may be positioned to have the same intensity of the emitted light. For example, a number of the slots positioned in two adjacent regions At−1 and At among the plurality of divided regions A1-Am of the light guide G3 may be different from each other.

Since the part U1 to Ub−1 of the light is transmitted in each of the slot SP1 to SPb−1, as the light progresses inside the light guide G3, the intensity of the light K1-Kb reflected from the slot toward the spatial light modulation unit 22 is gradually decreased. However, when the number of the slots in each of the regions A1-Am is changed, the intensity of the light emitted to each of the regions A1-Am may be approximately uniform.

For example, the slots SPt and SPt+1 may be positioned corresponding to the region At so that the magnitude of the light K1 emitted to the region A1 and the sum of the magnitude of the lights Kt and Kt+1 emitted from the region At are equal to each other.

For example, the slots SPb−2, SPb−1, and SPb may be positioned corresponding to the region Am so that the magnitude of the light K1 emitted to the region A1 and the sum of the magnitudes of the lights Kb−2, Kb−1, and Kb emitted to the region Am are equal to each other.

Also, since the second light division unit B1 is disposed on the surface lighting plate 16 to have a width in the y-axis direction and a length in the x-axis direction, the surface lighting plate 16 may reflect (e.g., direct) planar light to the spatial light modulation unit 22. To reduce the deviation of the intensity of the light emitted to each region, the spatial light modulation unit 22 changes the liquid crystal arrangement of the liquid crystal layer to modulate the intensity of the light passing through the spatial light modulation unit 22.

According to an exemplary embodiment of the present invention, planar light having a substantially uniform intensity may be provided from each of the second light unit divisions B1-Bn and from each region of each of the second light unit divisions B1-Bn. In addition, the planar light may have good coherence.

The characteristics of the second light division unit B1 described in FIG. 3 to FIG. 5 may also be applied to the first light division unit 14.

While the present invention has been particularly shown and described with reference to exemplary embodiments thereof, it will be apparent to those of ordinary skill in the art that various changes in form and detail may be made therein without departing from the spirit and scope of the present invention.

What is claimed is:

1. An illumination apparatus, comprising:
   a light source unit emitting coherent light in a first direction;
   a first light division unit, including a plurality of first slots, receiving the coherent light, wherein each slot of the plurality of first slots reflects a part of the coherent light in a second direction crossing the first direction; and
   a surface lighting plate including a plurality of second light division units, wherein each light division unit of the plurality of second light division units includes a light guide through which light progresses, and wherein each light division unit of the plurality of second light division units includes a plurality of second slots,
   wherein each slot of the plurality of second slots of each light division unit of the plurality of second light division units reflects a part of the coherent light received from a corresponding slot of the plurality of first slots in a third direction, wherein the third direction crosses the first and second directions.

2. The illumination apparatus of claim 1, wherein the light source unit includes:
   a light emitting diode (LED) light source;
   a pinhole positioned in a progression direction of the coherent light emitted from the LED light source; and
   a collimator collimating the coherent light passing through the pinhole.

3. The illumination apparatus of claim 1, wherein each slot of the plurality of first slots has a same reflectance.

4. The illumination apparatus of claim 1, wherein the first light division unit further includes a light guide through which the coherent light, emitted from the light source unit, progresses, and
a refractive index of the plurality of first slots and a refractive index of the light guide are different from each other.

5. The illumination apparatus of claim 4, wherein the refractive index of the light guide is smaller than the refractive index of the plurality of first slots.

6. The illumination apparatus of claim 1, wherein, in a given second light division unit of the plurality of second light division units, a number of second slots of the plurality of second slots disposed in a first region of the given second light division unit is different from a number of second slots of the plurality of second slots disposed in a second region of the given second light division unit, wherein the first and second regions of the given second light division unit are adjacent to each other.

7. An illumination apparatus, comprising:
a light source unit emitting coherent light in a first direction;
a first light division unit including a plurality of first slots receiving the coherent light, wherein each slot of the plurality of first slots reflects a part of the coherent light in a second direction crossing the first direction; and
a surface lighting plate including a light guide and a plurality of second light division units reflecting a part of the coherent light received from a corresponding slot of the plurality of first slots in a third direction, wherein the third direction crosses,
wherein a plurality of first prisms is disposed at a first surface of the light guide, each prism of the plurality of first prisms having a first diagonal surface, and
wherein a plurality of second prisms is disposed at a second surface of the light guide, the first and second surfaces of the light guide being opposite to each other, and each prism of the plurality of second prisms has a second diagonal surface.

8. A holographic display apparatus, comprising:
a lighting unit emitting planar light; and
a spatial light modulation unit modulating at least one of an amplitude or a phase of the planar light,
wherein the lighting unit includes:
a light source unit emitting coherent light in a first direction;
a first light division unit including a plurality of first slots and receiving the coherent light, wherein each slot of the plurality of first slots reflects a part of the coherent light in a second direction crossing the first direction; and
a surface lighting plate including a plurality of second light division units, wherein each light division unit of the plurality of second light division units includes a light guide through which light progresses, and wherein each light division unit of the plurality of second light division units includes a plurality of second slots,
wherein each slot of the plurality of second slots of each light division unit of the plurality of second light division units reflects a part of the coherent light received from a corresponding slot of the plurality of first slots in a third direction, wherein the third direction crosses the first and second directions, and
wherein the planar light emitted from the lighting unit is the light reflected in the third direction from the plurality of second light division units.

9. The holographic display apparatus of claim 8, wherein the light source unit includes:
a light emitting diode (LED) light source;
a pinhole positioned in a progression direction of the coherent light emitted from the LED light source; and
a collimator collimating the coherent light passing through the pinhole.

10. The holographic display apparatus of claim 8, wherein each slot of the plurality of first slots has a same reflectance.

11. The holographic display apparatus of claim 8, wherein the first light division unit further includes a light guide through which the coherent light, emitted from the light source unit, progresses, and
a refractive index of the plurality of first slots and a refractive index of the light guide are different from each other.

12. The holographic display apparatus of claim 11, wherein the refractive index of the light guide is smaller than the refractive index of the plurality of first slots.

13. The holographic display apparatus of claim 8, wherein, in a given second light division unit of the plurality of second light division units, a number of second slots of the plurality of second slots disposed in a first region of the given second light division unit is different from a number of second slots of the plurality of second slots disposed in a second region of the given second light division unit, wherein the first and second regions of the given second light division unit are adjacent to each other.

14. The holographic display apparatus of claim 8, wherein the spatial light modulation unit modulates an intensity of the light reflected from at least one slot of the plurality of second slots.

15. An illumination apparatus, comprising:
a light source unit emitting coherent light in a first direction;
a first light division unit including a plurality of first slots receiving the coherent light, wherein each slot of the plurality of first slots reflects a part of the coherent light in a second direction crossing the first direction, wherein each slot of the plurality of first slots extends along a direction that forms an acute angle with respect to the first and second directions; and
a surface lighting plate including a plurality of second light division units, wherein each light division unit of the plurality of second light division units extends in a plane formed by the first and second directions and includes a light guide through which light progresses, wherein each light division unit of the plurality of second light division units includes a plurality of second slots,
wherein each slot of the plurality of second slots of each light division unit of the plurality of second light division units reflects a part of the coherent light received from a corresponding slot of the plurality of first slots in a third direction, wherein the third direction crosses the first and second directions,
wherein each slot of the plurality of second slots extends along a direction that forms an acute angle with respect to the second and third directions.

16. The holographic display apparatus of claim 15, wherein slots included in the plurality of first slots are evenly spaced apart from each other.

17. The holographic display apparatus of claim 15, wherein separation distances between slots included in the plurality of first slots are different with respect to each other.

18. The holographic display apparatus of claim 15, wherein slots included in the plurality of second slots of a light division unit of the plurality of second light division units are evenly spaced apart from each other.

19. The holographic display apparatus of claim 15, wherein separation distances between slots included in the plurality of second slots of a light division unit of the plurality of second light division units are different with respect to each other.

\* \* \* \* \*